United States Patent [19]
Radin

[11] 3,812,401
[45] May 21, 1974

[54] OVERTEMPERATURE PROTECTION SYSTEM FOR EXHAUST GAS CONVERSION DEVICE

[75] Inventor: Bernard G. Radin, Oak Park, Mich.

[73] Assignee: Ford Motor Company, Dearborn, Mich.

[22] Filed: Apr. 4, 1973

[21] Appl. No.: 347,961

[52] U.S. Cl............ 317/40 R, 317/40 A, 317/133.5
[51] Int. Cl. ......................................... G05d 23/22
[58] Field of Search.......... 317/40 R, 40 A, 41, 132, 317/133.5

[56] References Cited
UNITED STATES PATENTS

| | | | |
|---|---|---|---|
| 3,419,794 | 12/1968 | Weaver, Jr. et al................ | 317/40 R |
| 3,684,172 | 8/1972 | Evalds............................. | 317/133.5 |
| 3,729,656 | 4/1973 | Luquain............................ | 317/40 A |

*Primary Examiner*—L. T. Nix
*Attorney, Agent, or Firm*—Robert W. Brown

[57] ABSTRACT

An overtemperature protection system for an exhaust gas conversion device, such as a thermal reactor or catalytic converter. Preferably, the system includes a thermocouple temperature sensor located on the exhaust gas conversion device, an electrically-actuated control device for diminishing the operation of the exhaust gas conversion device, and a warning device. Electrical circuitry is provided for actuating the control device in response to the attainment of a first predetermined temperature sensed by the temperature sensor. A warning device may also be actuated at this first predetermined temperature. Additional electrical circuitry provides retained actuation of the control means and warning devices upon the occurrence of a second predetermined temperature sensed by the temperature sensor, the second predetermined temperature being higher than the first predetermined temperature. The thermocouple reference junction is compensated for ambient temperature and electrical circuitry is provided for actuating the control and warning devices upon the occurrence of an open circuit at the temperature-sensing junction of the thermocouple.

8 Claims, 1 Drawing Figure

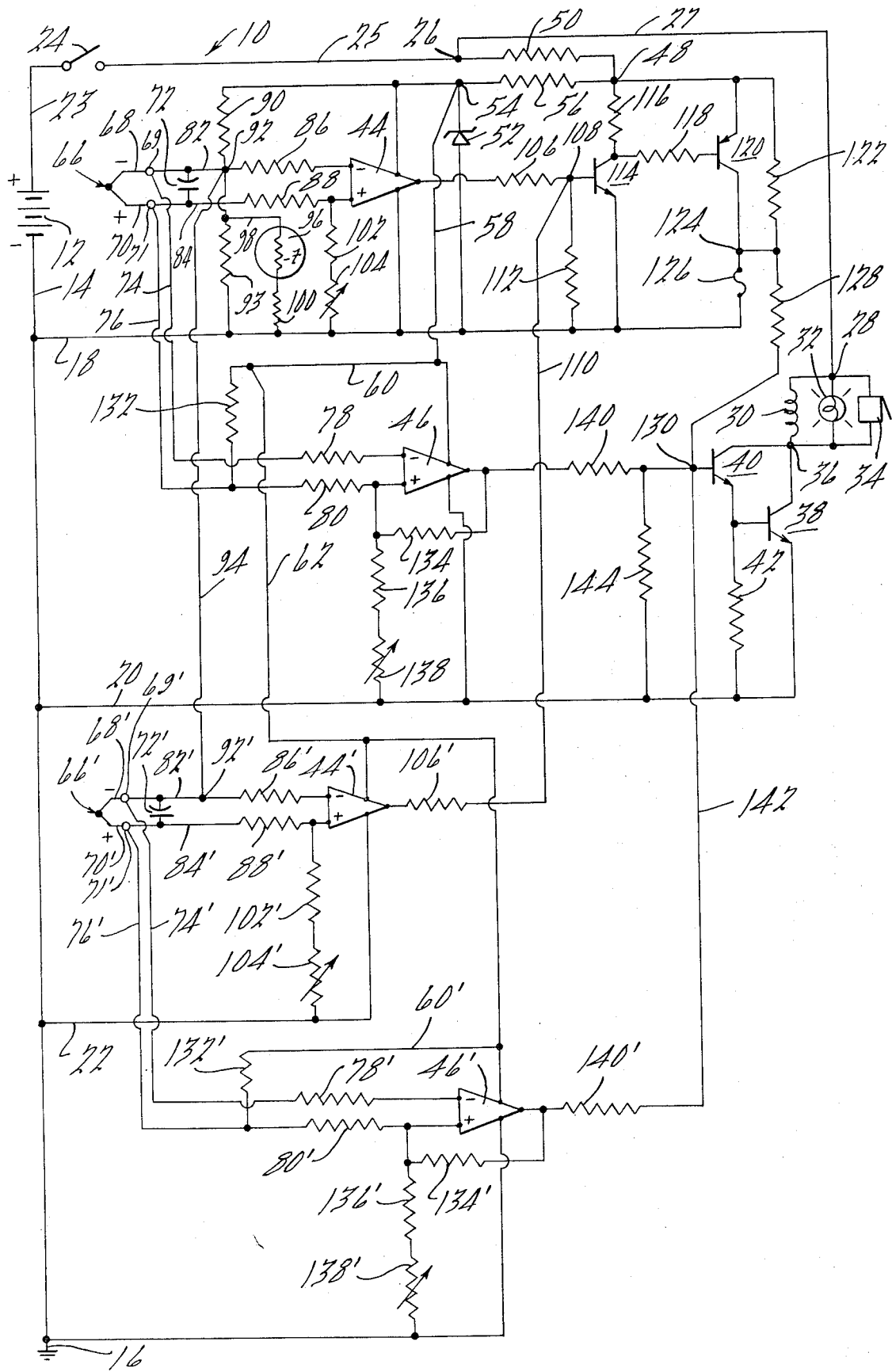

3,812,401

OVERTEMPERATURE PROTECTION SYSTEM FOR EXHAUST GAS CONVERSION DEVICE

BACKGROUND OF THE INVENTION

This invention relates to an overtemperature protection system for an exhaust gas conversion device, such as a thermal reactor or a catalytic converter used to convert nonxious exhaust gases from engine combustion into harmless substances.

Various proposals have been made for the use of catalytic converters and thermal reactors, positioned in the exhaust stream emanating from engines or motor vehicles, to convert the exhaust gases into harmless substances. These catalytic converters and thermal reactors generally operate at elevated temperatures, for example, 1,500° to 1,700°F. The conversion of exhaust gases into harmless substances involves exothermic chemical reactions. The heat energy released by these chemical reactions may at times raise the temperature of the catalytic converter or thermal reactor to a level where permanent damage results. This heat build-up may occur very rapidly in some situations. For example, when engine misfires occur and, as a result, raw fuel is delivered to the exhaust gas conversion device, temperatures of the device may rise to a critical level within a very short time.

Various control devices may be used to prevent overtemperature damage to an exhaust gas conversion device. For example, where thermal reactors and catalytic converters of the oxidation type are employed, an auxiliary air supply is usually provided to promote oxidation of hydrocarbons and carbon monoxide. In this case, a control device, such as a solenoid valve or a relay controlling a solenoid valve, may be used to cut-off the auxiliary air supply to the thermal reactor or catalytic converter when it reaches a predetermined temperature. Also, the control device can be used to actuate a by-pass valve that causes the exhaust gases emitted by the engine to bypass the thermal reactor or catalytic converter. In any case, the control device is used to directly or indirectly actuate some means for diminishing the operation of the exhaust gas conversion device thereby to decrease the heat energy released in the exothermic chemical reactions that take place during the conversion process. In addition to this function of protecting the exhaust gas conversion device, an overtemperature protection system should include means for providing the motor vehicle operator with an indication of a malfunction in the exhaust gas conversion system upon occurrence of an overtemperature condition.

SUMMARY OF THE INVENTION

It is an object of the invention to provide an overtemperature protection system for an exhaust gas conversion device.

Another object of the invention is to provide an overtemperature protection system wherein a control device for diminishing the operation of an exhaust gas conversion device is actuated at a first predetermined temperature attained by the conversion device and to provide a warning indication of occurrence of the first predetermined temperature.

A further object is to provide retained actuation of the control device and the warning indication at a second predetermined temperature of the conversion device, the second predetermined temperature being higher than the first.

A still further object is to provide thermocouple sensing of the temperature of the exhaust gas conversion device and to provide solid state electrical circuitry, including differential amplifiers, in an overtemperature protection system.

A still further object is to provide electrical circuitry for activating a warning device upon the occurrence of an open-circuit condition of a thermocouple used to sense the temperature of an exhaust gas conversion device and to provide electrical circuitry to compensate the reference junction of the thermocouple for changes in ambient temperatures.

These and other objects of the invention may be satisfied with an overtemperature protection system including a thermocouple for sensing temperature at a selected location on or in the exhaust gas conversion device, an electrically-actuated control device for diminishing the operation of the exhaust gas conversion device, and a warning device for indicating a malfunction or overtemperature condition of the exhaust gas conversion device. Electrical circuitry is coupled to the thermocouple and to the control and warning devices and is responsive at a first predetermined temperature sensed by the thermocouple to cause the actuation of the control device. The electrical circuitry also energizes the warning device upon occurrence of the first predetermined temperature.

Additional electrical circuitry is provided for causing retained actuation of the control device and warning device upon the occurrence of a second predetermined temperature sensed by the thermocouple. This electrical circuitry preferably includes a replaceable fusible element that opens a circuit upon the occurrence of the second predetermined temperature thereby to provide the aforementioned retained actuation. The second predetermined temperature is higher than the first predetermined temperature and preferably it is a maximum temperature for the conversion device above which permanent damage is likely. The phrase "retained actuation" refers to continued actuation of the control or warning device even though the temperature of the conversion device may subsequently fall below the temperature at which such actuation is initiated.

The overtemperature protection system includes circuitry that is capable of causing actuation of the warning device upon the occurrence of an open-circuit condition of the temperature sensing junction of the thermocouple, this junction being at a selected location on or in the exhaust gas conversion device. Also, circuit means is provided for compensating the reference or "cold" junction of the thermocouple for changes in ambient temperature conditions.

The invention may be better understood by reference to the detailed description which follows and to the drawing.

BRIEF DESCRIPTION OF THE DRAWING

The drawing is a schematic electrical diagram of an overtemperature protection system for use with two exhaust gas conversion devices.

DETAILED DESCRIPTION OF THE INVENTION

With reference to the drawing, wherein components or circuit connections designated by primed numerals are identical to those designated by corresponding unprimed numerals, there is shown a schematic electrical diagram of an overtemperature protection system suitable for use with two exhaust gas conversion devices. The two exhaust gas conversion devices may be two thermal reactors, two catalytic converters, or one of each. The circuitry shown in the drawing is particularly suitable for use in an exhaust gas purification system for a motor vehicle where, in the caseof V–8 engines for such vehicles, one catalytic converter may be used to purify the exhaust from four of the engine's cylinders and another may be used to purify the exhaust from the remaining four cylinders, or where the purification system includes a thermal reactor and a catalytic converter both of which require overtemperature protection.

The overtemperature protection system, generally designated by the numeral 10, utilizes a DC source of electrical energy 12 having its negative terminal 14 connected to ground at 16. Additional ground leads 18, 20 and 22 are connected to the negative terminal of the source of electrical energy 12. The positive terminal 23 of the source of electrical energy 12 is connected to one side of a conventional motor vehicle ignition switch 24. The other side of the ignition switch 24 is connected by a lead 25 to a junction 26. A lead 27 connected to the junction 26 is used to supply electrical energy to a junction 28 formed by the parallel-connection of an inductive control device 30, a warning light 32, and a warning buzzer 34. The opposite sides of the devices 30, 32 and 34 are connected at a junction 36 to the collectors of transistors 38 and 40. The transistors 38 and 40 are connected in a Darlington configuration, the emitter of the transmitter 40 being connected to the base of the transistor 38 and the emitter of the transistor 38 being connected to the ground line 20. A resistor 42 is connected to the emitter of the transistor 40 and to the ground lead 20.

The inductive control device 30 when energized is used to diminish the operation of the two exhaust gas conversion devices for which the circuit 10 provides over-temperature protection. The control device 30 may be a coil of a solenoid valve used to cut-off the air supply to the exhaust gas conversion devices or it may be the coil of a relay used to actuate some other means for performing this function. Alternatively, the inductive control device 30 may be used to control or actuate a valve that diverts exhaust gases through a flow path that bypasses the exhaust gas conversion devices. The parallel connection of the warning light 32 and buzzer 34 with the inductive control device 30 results in their energization when the control device is actuated.

The overtemperature protection system 10 includes four differential amplifiers 44, 46, 44' and 46'. The amplifiers 44 and 44' have similar functions and circuit connections as do the amplifiers 46 and 46'. The amplifier 46 is used to cause the actuation of the control device 30 and warning devices 32 and 34 in response to the sensing of a first predetermined temperature by a thermocouple positioned on or in one of the exhaust gas conversion devices. The amplifier 44 is responsive to this thermocouple, at a second predetermined temperature higher than the first predetermined temperature, to cause retained actuation of the control device 30 and warning devices 32 and 34. The amplifiers 46' and 44' are coupled to a second thermocouple positioned on or in the other exhaust gas conversion device to actuate the control device 30 and warning devices 32 and 34 upon the occurrence of, respectively, a first predetermined temperature and a second predetermined temperature of this other exhaust gas conversion device.

The differential amplifiers 44, 46, 44' and 46', and their associated circuitry, are provided with a regulated voltage. This is accomplished with resistors 50 and 56 and a zener diode 52. The resistor 50 has one of its terminals connected to the junction 26 and has its other terminal connected to a junction 48 to which the resistor 56 is also connected at one of its terminals. The other terminal of the resistor 56 is connected at junction 54 to the cathode of the zener diode 52, the anode of which is connected to the ground lead 18. Thus, the zener diode 52 provides a regulated voltage at the junction 54. This regulated voltage is supplied to the amplifier 44 and its associated circuitry and, via a lead 58, to a lead 60 supplying the amplifier 46 and its associated circuitry. A lead 62 connected to the lead 60 supplies the regulated voltage to the amplifier 44' and its associated circuitry and also supplies the regulated voltage to a lead 60' for the amplifier 46' and its associated circuitry.

A thermocouple 66, used to sense the temperature of one of the exhaust gas conversion devices, is formed by a pair of dissimilar wires 68 and 70, these dissimilar wires being joined together at one end to form a temperature-sensing junction for connection to one of the exhaust gas conversion devices. A reference or "cold" junction of the thermocouple 66 is formed by a terminal 69 at theend of the thermocouple wire 68 and by a terminal 71 at the end of the thermocouple wire 70. The thermocouple has the polarity indicated in the drawing. A lead 74 is connected to the terminal 69 and to one side of a resistor 78, the other side of which is connected to the negative input terminal of the amplifier 46. Similarly, a lead 76 is connected to the thermocouple terminal 71 and to one side of a resistor 80, the other side of which is connected to the positive terminal of the amplifier 46.

The thermocouple voltage is also applied to the amplifier 44 via a lead wire 82 connected to the terminal 69 and to a resistor 86 that is connected to the negative input terminal of the amplifier 44. The terminal 71 is connected by a lead 84 to a resistor 88 that is connected to the positive terminal of the amplifier 44. A filter capacitor 72 is connected across the terminals 69 and 71 of the thermocouple 66 to reduce the affects of ignition and other vehicle electrical noise.

A resistor 90 has one of its terminals connected to the regulated voltage junction 54 and has its other terminal connected to a junction 92 formed by the lead 82 and the amplifier input resistor 86. A resistor 93 has one of its terminals connected to the junction 92 and has its other terminal connected to the ground lead 18. A lead 94 is used to convey the voltage at the junction 92 to a corresponding junction 92' on a thermocouple 66' that is used to sense the temperature of the other exhaust gas conversion device and to provide a voltage indicative thereof to the amplifier 44' and 46'.

Connected in parallel with the resistor 93 is the series connection of a thermistor 96, having a negative temperature coefficient, and a resistor 100. The thermistor 96 provides compensation of the thermocouple 66 for changes in ambient temperature levels and is located to sense such temperature variations.

A resistor 102 has one of its terminals connected to the positive input terminal of the amplifier 44 and has its other terminal connected to one terminal of a variable calibarion resistance 104, the other terminal of which is connected to the ground lead 18. The output of the amplifier 44 is connected to one terminal of a resistor 106 the other terminal of which is connected to a junction 108. A lead 110 connects the corresponding output resistor 106' of the amplifier 44' to the junction 108. A resistor 112 is connected between the junction 108 and the ground lead 18. The resistors 106 and 106' in combination with the resistor 112 are used to divide the voltage outputs of the respective amplifiers 44 and 44' so that the voltage at the junction 108 will be a reduced value.

The junction 108 is connected to the base of an NPN transistor 114 the emitter of which is connected to the ground leas 18 and the collector of which is connected through a resistor 116 to the voltage supply junction 48 formed between the resistors 50 and 56. The collector of the transistor 114 is also connected through a current-limiting resistor 118 to the base of a PNP transistor 120. The emitter of the transistor 120 is connected to the voltage supply junction 48, as is one terminal of a resistor 122. The collector of the transistor 120 and the other terminal of the resistor 122 are connected together at a junction 124. A fuse 126 has one of its terminals connected to the junction 124 and has its otheer terminal connected to the ground lead 18. Also, a resistor 128 has one of its terminals connected to the junction 124 and has its other terminal connected to a junction 130 at the base of the transistor 40.

With respect to the amplifier 46, its circuit connections include a resistor 132 connected to the regulated voltage supply lead 60 and to the lead 76 connected to thermocouple junction 71. Also, a resistor 136 has one of its terminals connected to the positive input terminal of the amplifier 46 and has its other terminal connected to a variable calibration resistor 138. The variable resistor 138 is connected to ground lead 20. A positive feedback resistor 134 has one of its terminals connected to the output of the amplifier 46 and has its other terminal connected to the positive input terminal of amplifier 46. The amplifier 46 has a resistor 140 connected to its output terminal and, simmilarly, the amplifier 46' has a resistor 140' connected to its output terminal. The resistor 140 is connected to the junction 130 as is the resistor 140' by its lead 142. A resistor 144 is connected between the junction 130 and the ground lead 20. The resistors 140 and 140° in combination with the resistor 144 divide the respective voltage outputs of the amplifiers 46 and 46' between them such that the voltage at the junction 130 is at a reduced level The differential amplifiers 44, 46, 44' and 46' are used as high-input-impedance switches. The output of the differential amplifier 46 changes from a low voltage level to a high voltage level upon the occurrence of a first predetermined temperature, for example, 1,700°F, sensed by the thermocouple 66. The differential amplifier 44 responds to a second and higher predetermined temperature level, for example, 2,100°F, sensed by the thermocouple 66. The differential amplifier 46' is calibrated to respond to the first predetermined temperature, sensed by its associated thermocouple 66', and the differential amplifier 44' is calibrated to respond to the higher second predetermined temperature, this also being sensed by the thermocouple 66'.

An understanding of the operation of the circuit 10 is facilitated by assuming first that the ignition switch 24 is closed and that the termperatures of the two exhaust gas conversion devices are below the first predetermined level. In such case, the voltage of the source of electrical energy 12 is divided by the combination of the resistors 50 and 56 and the zener diode 52. Thus the voltage at the junction 48 is reduced from the supply voltage and a regulated voltage appears at the junction 54. A current flows from the junction 54 through the series combination of the resistors 90 and 93 to produce a divided voltage at the junction 92 on the lead 82 connected to the terminal 69 of the thermocouple 66. In the absence of ambient temperature changes, the voltage at the junction 92 remains substantially constant.

The thermocouple 66 has a voltage across its terminals 71 and 69, with the polarity indicated, that is proportional to the temperature difference betweeen its temperature-sensing junction nad its reference junction. A small current flows through the lead 82 and the thermocouple leads 68 and 70 to the terminal 71 of thermocouple 66. At the terminal 71, this current is divided between the leads 76 and 84. The current through the lead 76 flows through the resistor 80, and through the resistors 136 and 138, to ground. Similarly, the current in the lead 84 flows through the resistor 88, the resistor 102, and the resistor 104 to ground.

The voltage at the thermocouple terminal 69 is applied through the resistor 78 to the negative input terminal of the differential amplifier 46 and through the input resistor 86 to the negative input terminal of the differential amplifier 44. The small current through the resistor 80 produces a voltage across it having a polarity that is opposite to the polarity of the voltage across the thermocouple 66. Thus, the thermocouple voltage and the voltage across the resistor 80 are opposed and the amount of current through the resistor 80 determines the voltage drop across it. This current is controlled by the variable calibration resistor 138. Similarly, the variable calibration resistor 104 controls the voltage drop across the resistor 88 connected to the positive input terminal of the differential amplifier 44.

When the temperature of the exhaust gas conversion device associated with the thermocouple 66 rises to the first predetermined level determined by the setting of the variable calibration resistor 138, the voltage across the thermocouple terminals 71 and 69 exceeds the voltage across the resistor 80 by an amount sufficient to cause the differential amplifier 46 to amplify its small differential input voltage. The differential amplifier 46 has a very high gain and has positive feedback through the resistor 134. Its output voltage very rapidly rises to a high or saturation level upon the occurrence of the first predetermined temperature sensed by the thermocouple 66. The positive feedback resistor 134 provides hysteresis in this amplifier circuit such that a drop in temperature of the exhaust gas conversion device, for example, by 200°F, is required in order to cause the output voltage of the amplifier 46 to fall to its low voltage level.

When the output voltage of the differential amplifier 46 reaches a high voltage level, this voltage is divided by the combination of the resistors 140 and 144 such that a reduced voltage level is applied to the base of the transistor 40. This supplies base-emitter current for the transistor 40, it becomes conductive, and supplies the base drive for the transistor 38. When the transistor 38 becomes conductive, current flows from the source of electrical energy 12, through the leads 25 and 27, to the control device 30 and warning devices 32 and 34 to produce their actuation. Actuation of the control device 30 diminishes the operation of the exhaust gas conversion device the temperature of which has exceeded the first predetermined value. The control and warning devices remain actuated until the temperature of the exhaust gas conversion device falls below, by an amount determined by the aforementioned circuit hysteresis, the first predetermined temperature.

Now let it be assumed that the temperaturre of the exhaust gas conversion device associated with the thermocouple 66 exceeds the second predetermined temperature level higher than the first. In such case, the voltage across the thermocouple terminals 71 and 69 will exceed the voltage across the input resistor 88 by an amount sufficient to equal the threshhold voltage level required at the input terminals of the differential amplifier 44. The differential amplifier 44 then produces a high voltage level at its output.

Prior to the time when the output voltage of the differential amplifier 44 becomes a high level, the voltage at the junction 124 is low because the transistor 120 is nonconductive. When the output voltage of the differential amplifier 44 becomes high, the voltage at the junction 108 becomes sufficiently high to produce a base-emitter current in the transistor 114 that renders it fully conductive. Thus, the voltage at the collector of the transistor 114 becomes very low and the PNP transistor 120 becomes conductive. Conduction of the transistor 120 produces a short-circuit between the junction 48 and the ground lead 18 through the fuse 126. The fuse 126 melts producing an open circuit between its terminals, and current then flows through the resistor 128, via either the transistor 120 or the resistor 122 or both, to the junction 130. At the junction 130 the current flows across the baseemitter junction of the transistor 40 to result in its retained conduction, along with the retained conduction of the transistor 38. This conductive state of the transistors 40 and 38 is retained even if the output voltages of either the amplifier 44 or amplifier 46 fall to a low level due to decreased temperatures of the exhaust gas conversion device. Conduction of the transistors 40 and 38 due to the melting of the fuse 126 results in retained actuation of the control device 30 and the warning device 32 and 34. Thus, these devices attain a retained actuation state whenever the temperature sensed by the thermocouple 66 exceeds the second predetermined level. Replacement of the fuse 126 is required to de-activate the control and warning devices. This replacement should be accompanied by inspection of the exhaust gas conversion devices to determine if they were damaged by the overtemperature condition.

The amplifier 44' and 46' respond to temperatures sensed by the thermocouple 66' in the same manner, respectively, as the amplifiers 44 and 46 respond to temperatures sensed by the thermocouple 66.

As was stated previously, the thermistor 96 provides compensation of the thermocouple reference junction for changes in ambient temperature. As ambient temperature increases, the thermocouple reference junction, terminals 69 and 71, also increases in temperature. Assuming that the temperature-sensing function of the thermocouple remains at a constant temperature, then increases in reference junction temperature reduce the voltage produced across the thermocouple terminals. In order to compensate for this, it is necessary to reduce the voltage across the resistor 88. This is accomplished with the negative-temperature-coefficient thermistor the resistance of which decreases as ambient temperature increases. This results in a reduction of the voltage at the junction 92. A reduction of the voltage at this point reduces the current flow through the resistor 88 and, consequently, the voltage drop across it. This also compensates the thermocouple 66' for changes in ambient temperature because the reduced voltage at the junction 92 is applied to the junction 92' through the lead 94.

In the event that the temperature-sensing junction of the thermocouple 66 should become open-circuited, the regulated supply voltage on the lead 60 is applied through the resistor 132 to the lead 76. The lead 76 is connected through the resistor 80 to the positive terminal of the differential amplifier 46. A positive voltage at this point, in excess of the voltage obtained from junction 92 and applied to the amplifier negative terminal, causes the amplifier output voltage to increase to its high level. This results, as was previously described, in the conduction of the transistors 40 and 38 and the actuation of the control device 30 and warning devices 32 and 34. The supply line 60' connected to the resistor 132' performs a similar function for the thermocouple 66' should it become open-circuited at its temperature-sensing junction.

What is claimed is:

1. An overtemperature protection system for an exhaust gas conversion device, said system comprising: means for sensing temperature at a selected location on or in said exhaust gas conversion device; electrically-actuated control means for diminishing the operation of said exhaust gas conversion device; and circuit means for actuating said control means and for retaining said control means in actuated condition, said circuit means being coupled to said temperature sensing means and to said control means and casuing said retained actuation of said control means at a predetermined temperature sensed by said temperature sensing means.

2. An overtemperature protection system in accordance with claim 1, wherein said temperature sensing means includes a thermocouple having a temperature-sensing junction for location on or in said exhaust gas conversion device and wherein said circuit means includes means for actuating said control means when the temperature-sensing junction of said thermocouple is in an open-circuit condition.

3. An overtemperature protection system in accordance with claim 2, wherein said thermocouple includes a reference junction and wherein said circuit means includes means for compensating said thermocouple reference junction for changes in ambient temperature.

4. An overtemperature protection system in accordance with claim 3, wherein said circuit means includes a differential amplifier having its input terminals coupled to said thermocouple and having its output terminals coupled to said control means, said circuit means further including a fusible element coupled to the output of said differential amplifier, said fusible element being open-circuited in response to a change in the output of said differential amplifier, and the open-circuiting of said fusible element resulting in said retained action of said control means.

5. An overtemperature protection system for an exhaust gas conversion device, said system comprising: means for sensing temperature at a selected location on or in said exhaust gas conversion device; electrically-actuated control means for diminishing the operation of said exhaust gas conversion device; first circuit means for actuating said control means, said first circuit means being coupled to said temperature-sensing means and to said control means, said first circuit means being responsive at a first predetermined temperature sensed by said temperature-sensing means to cause said actuation of said control means; second circuit means for retaining said control means in actuated condition, said second circuit means being coupled to said temperature-sensing means and to said control means, said second circuit means being responsive at a second predetermined temperature, higher than said first predetermined temperature, sensed by said temperature-sensing means to cause said retained actuation of said control means.

6. An overtemperature protection system in accordance with claim 5, wherein said temperature-sensing means includes a thermocouple having a temperature-sensing junction for location on or in said exhaust gas conversion device and wherein said first circuit means includes means for actuating said control means when the temperature-sensing junction of said thermocouple is in an open-circuit condition.

7. An overtemperature protection system in accordance with claim 6, wherein said thermocouple includes a reference junction and wherein said system further includes circuit means for compensating said thermocouple reference junction for changes in ambient temperature.

8. An overtemperature protection system in accordance with claim 7, wherein said first circuit means includes a differential amplifier having its input terminals coupled to said thermocouple and having its output coupled to said control means and circuit means for causing the output of said first differential amplifier to change from a first level to a second level upon the sensing by said thermocouple of said first predetermined temperature; wherein said second circuit means includes a second differential amplifier having its input terminals coupled to said thermocouple and having its output coupled to said control means and circuit means for causing the output of said second differential amplifier to change from a first level to a second level upon the sensing by said thermocouple of said second predetermined temperature; and wherein said system further includes a fusible element coupled to the output of said second differential amplifier, said fusible element being open-circuited when the output of said second differential amplifier changes from its first level to its second level, said open-circuiting of said fusible element resulting in said retained actuation of said control means.

* * * * *